(12) United States Patent
Pruett et al.

(10) Patent No.: US 8,095,269 B2
(45) Date of Patent: Jan. 10, 2012

(54) DYNAMIC ROLLOVER PREVENTION

(75) Inventors: James A. Pruett, Allen, TX (US);
Timothy E. Adams, Allen, TX (US);
Christopher T. Moshenrose, Allen, TX (US)

(73) Assignee: Raytheon Company, Waltham, MA (US)

( * ) Notice: Subject to any disclaimer, the term of this patent is extended or adjusted under 35 U.S.C. 154(b) by 378 days.

(21) Appl. No.: 12/357,313

(22) Filed: Jan. 21, 2009

(65) Prior Publication Data

US 2010/0185354 A1  Jul. 22, 2010

(51) Int. Cl.
*B60R 21/13* (2006.01)

(52) U.S. Cl. .............. 701/39; 701/38; 701/45; 180/282; 180/271; 280/755

(58) Field of Classification Search .................. 280/5.5, 280/5.501, 5.502, 5.507, 5.513, 755; 701/36, 701/37, 38, 39, 45; 180/271, 282
See application file for complete search history.

(56) References Cited

U.S. PATENT DOCUMENTS

| | | | |
|---|---|---|---|
| 3,580,354 A * | 5/1971 | Hewitt ........................... 180/282 |
| 5,610,575 A | 3/1997 | Gioutsos |
| 6,095,459 A * | 8/2000 | Codina ........................ 244/213 |
| 6,170,594 B1 * | 1/2001 | Gilbert ........................ 180/282 |
| 6,225,894 B1 | 5/2001 | Kyrtsos |
| 6,282,474 B1 * | 8/2001 | Chou et al. ...................... 701/45 |
| 6,290,019 B1 * | 9/2001 | Kolassa et al. ................. 180/282 |
| 6,311,111 B1 | 10/2001 | Leimbach et al. |
| 6,494,281 B1 | 12/2002 | Faye et al. |
| 6,672,687 B2 | 1/2004 | Nishio |
| 6,711,482 B2 | 3/2004 | Shiino et al. |
| 6,741,922 B2 | 5/2004 | Holler |
| 6,938,924 B2 * | 9/2005 | Feldman et al. ............... 280/755 |
| 7,228,217 B2 | 6/2007 | Iyoda et al. |
| 7,463,953 B1 | 12/2008 | Lee et al. |
| 7,467,684 B2 * | 12/2008 | Wang et al. .................... 180/282 |
| 7,477,972 B2 | 1/2009 | Stavroff et al. |
| 7,494,153 B2 * | 2/2009 | Wang ............................ 280/755 |
| 2005/0033549 A1 | 2/2005 | Clark |
| 2005/0131604 A1 | 6/2005 | Lu |
| 2005/0230176 A1 * | 10/2005 | Wang ............................ 180/282 |
| 2005/0242557 A1 * | 11/2005 | Wang et al. .................... 280/755 |
| 2006/0190143 A1 | 8/2006 | Bauer |
| 2006/0276939 A1 | 12/2006 | Ameen |
| 2007/0027596 A1 * | 2/2007 | Stavroff et al. ................. 701/38 |
| 2007/0162202 A1 | 7/2007 | Moshchuk et al. |
| 2007/0260362 A1 * | 11/2007 | Piyabongkarn et al. .......... 701/1 |
| 2008/0103666 A1 | 5/2008 | Mun |
| 2008/0109135 A1 | 5/2008 | Lemmen et al. |
| 2008/0269976 A1 | 10/2008 | Birgersson |
| 2008/0319589 A1 | 12/2008 | Lee et al. |

* cited by examiner

*Primary Examiner* — Paul N Dickson
*Assistant Examiner* — Barry Gooden, Jr.
(74) *Attorney, Agent, or Firm* — Baker Botts L.L.P.

(57) ABSTRACT

In certain embodiments, a method includes accessing data associated with one or more vehicle parameters and determining, based on the data associated with the one or more vehicle parameters, if a vehicle rollover is imminent. The method includes determining, in response to a determination that a vehicle rollover is imminent, a roll countering solution. The method includes determining, based on the roll countering solution, one or more vehicle thrusters to execute the determined roll countering solution. The method includes signaling the one or more vehicle thrusters to discharge to execute the determined roll countering solution.

21 Claims, 4 Drawing Sheets

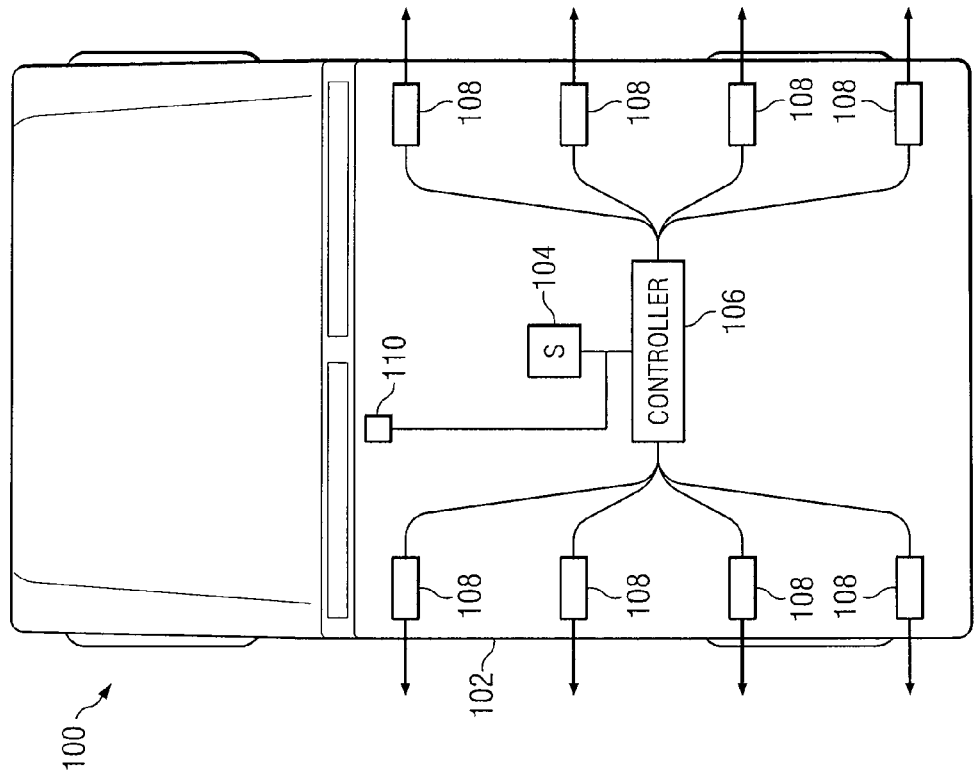
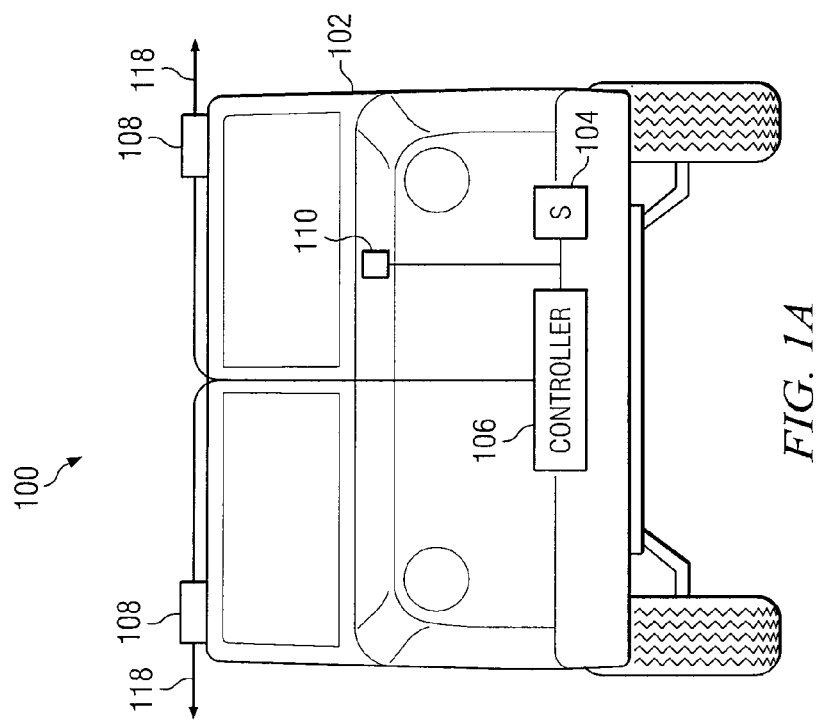

DYNAMIC ROLLOVER PREVENTION

TECHNICAL FIELD OF THE INVENTION

This invention relates generally to vehicle safety and more particularly to dynamic rollover prevention.

BACKGROUND

It is generally desirable to increase vehicle safety, as evidenced by the numerous vehicle safety advances that have been implemented over the past several decades. Due to the danger of serious injury to vehicle occupants associated with a vehicle rollover, increased vehicle safety in the area of rollover prevention may be particularly desirable.

SUMMARY

According to the present invention, disadvantages and problems associated with previous techniques for preventing rollover may be reduced or eliminated.

In certain embodiments, a method includes accessing data associated with one or more vehicle parameters and determining, based on the data associated with the one or more vehicle parameters, if a vehicle rollover is imminent. The method includes determining, in response to a determination that a vehicle rollover is imminent, a roll countering solution. The method includes determining, based on the roll countering solution, one or more vehicle thrusters to execute the determined roll countering solution. The method includes signaling the one or more vehicle thrusters to discharge to execute the determined roll countering solution.

Particular embodiments of the present invention may provide one or more technical advantages. Vehicles may be susceptible to a vehicle rollover depending on operating conditions of the vehicle, with some vehicles being more susceptible than others. Vehicles having a high center of gravity, for example, may have an increased likelihood of experiencing a vehicle rollover, especially during cornering. As a particular example, a United Stated Military High Mobility Multi-purpose Wheeled Vehicle (HMMWV) that has been outfitted with additional armor ("up-armored") may have an increased vehicle weight as well as a raised vehicle center of gravity. The raised center of gravity of the HMMWV may increase the likelihood that the vehicle will experience a vehicle rollover during cornering, which is especially dangerous if the vehicle is outfitted with a roof mounted machine gun (as the vehicle may roll over on the military personnel operating the roof mounted machine gun).

Conventional techniques for preventing vehicle rollover are typically preemptive. In other words, conventional techniques for preventing vehicle rollover may involve outfitting a vehicle in such as way as to attempt to prevent a vehicle rollover from occurring (e.g., by modifying the vehicle suspension) or training drivers to operate the vehicle in such a way as to attempt to avoid a vehicle rollover from occurring. Conventional techniques, however, are inadequate in that they are not responsive to a particular vehicle rollover once the vehicle rollover has started. The present invention provides the capability to respond to a particular vehicle rollover once the vehicle rollover has started by detecting the point at which a vehicle is close to rollover and warning the driver such that the driver may have an opportunity to avoid a vehicle rollover. Furthermore, the present invention provides the capability to respond to a particular vehicle rollover once the vehicle rollover has started by detecting the point at which a vehicle rollover is imminent and initiating the discharge of a force to counter the vehicle rollover, thereby increasing vehicle safety.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 1A-1B illustrate front and top views, respectively, of an example vehicle having example components of a system for performing dynamic rollover prevention, according to certain embodiments of the present invention;

DESCRIPTION OF EXAMPLE EMBODIMENTS

Figure 2:
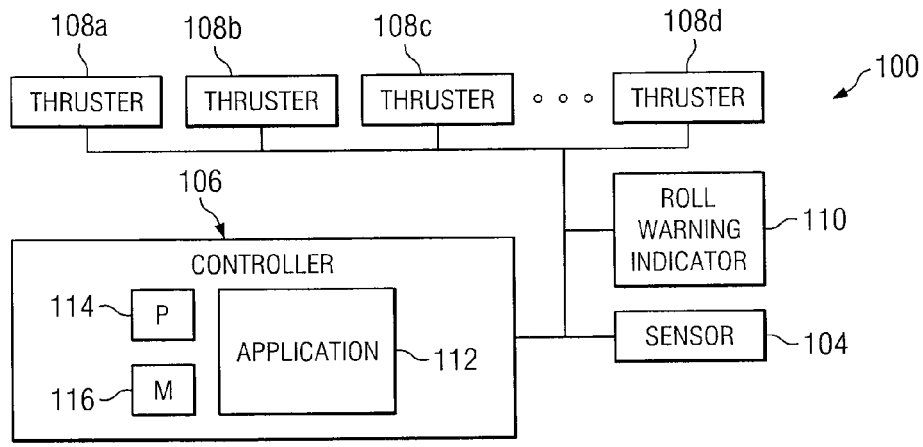
FIG. 2 illustrates an example system for performing dynamic rollover prevention, according to certain embodiments of the present invention.

FIG. 1A illustrates a front view of an example vehicle 102 having example components of a system 100 for performing dynamic rollover prevention, according to certain embodiments of the present invention. In certain embodiments, vehicle 102 is a United States Military HMMWV. System 100 may include one or more sensors 104, one or more roll countering controllers 106, one or more vehicle thrusters 108, and one or more roll warning indicators 114. For simplicity, the one or more sensors 104, one or more roll countering controllers 106, and one or more roll warning indicators 114 of system 100 are referred to throughout this description primarily in the singular.

In certain embodiments, both sensor 104 and roll countering controller 106 are mounted on the underside of vehicle 102 at an attachment point, such as the frame of vehicle 102. In certain embodiments, roll warning indicator 110 is mounted in the passenger cab of the vehicle such that it is in view of the driver of the vehicle. In certain embodiments, a plurality of vehicle thrusters 108 are mounted on either side of the roof of vehicle 102. Vehicle thrusters 108 may each be operable to deploy a thrust 118. In certain embodiments, vehicle thrusters 108 may be mounted such that thrust 118 may be deployed generally perpendicular to the line of travel of vehicle 102.

FIG. 1B illustrates a top view of an example vehicle 102 having example components of a system 100 for performing dynamic rollover prevention, according to certain embodiments of the present invention. In certain embodiments, eight vehicle thrusters 108 are mounted to the roof of vehicle 102, four on either side. Each of the vehicle thrusters 108 may be mounted in such a way as to deploy a thrust 118 in a direction generally perpendicular to the line of travel of vehicle 102.

In general, system 100 is operable to determine, based on data associated with one or more parameters of vehicle 102 recorded by roll sensor 104, whether vehicle 102 is close to rollover (the point at which the determination is made that vehicle 102 is close to rollover being pre-defined at any suitable point). In response to a determination that vehicle 102 is close to rollover, system 100 is operable to display a warning (e.g., via roll warning indicator 114) to the driver of vehicle 102. System 100 is further operable to determine, based on data associated with one or more parameters of vehicle 102 recorded by roll sensor 104, whether a vehicle rollover is imminent (the point at which the determination is made that vehicle 102 rollover is imminent being pre-defined at any suitable point). In response to a determination that rollover of vehicle 102 is imminent, system 100 is operable to determine a roll countering solution to counter the imminent rollover of vehicle 102. Countering the imminent vehicle rollover may include canceling the imminent vehicle rollover or otherwise slowing the imminent vehicle rollover. System 100 is further operable to determine one or more vehicle thrusters 108 to execute the determined rollover countering solution, and signal the one or more vehicle thruster 108 to discharge to execute the determined roll countering solution.

Although system 100 is depicted and primarily described as being implemented on a particular vehicle 102 (e.g., a United States Military HMMWV), the present invention contemplates system 100 being implemented on any suitable vehicle. For example, system 100 may be implemented on a school bus, a tractor trailer, a farm tractor, a piece of construction equipment, a boat, an airplane, or a helicopter. Additionally or alternatively, the present invention contemplates system 100 being implemented on any suitable structure. For example, system 100 may be implemented on a building or a stationary tower crane. As a particular example, system 100 may be implemented on a stationary tower crane in order to prevent the crane from falling over during high wind and/or earthquake conditions. In order to prevent the crane from falling over during high wind and/or earthquake conditions, system 100 may be operable to determine, based on data associated with one or more parameters of the stationary tower crane (e.g., deflection angle), if a crane fall over is imminent. In response to a determination that a crane fall over is imminent, system 100 may be operable to determine a solution to prevent the imminent crane fall over, determine one or more thrusters to execute the determined solution, and signal the one or more vehicle thrusters to discharge to execute the determined solution.

Additionally, although system 100 is illustrated and primarily described as having particular components, the present invention contemplates system 100 including any suitable components, according to particular needs. Additionally, although the components of system 100 are depicted and primarily described as being mounted in a particular location on a particular vehicle 102, the present invention contemplates the components of system 100 being mounted at any suitable location on any suitable vehicle, according to particular needs.

FIG. 2 illustrates an example system 100 for performing dynamic rollover prevention, according to certain embodiments of the present invention. As described above, system 100 may include a sensor 104, a roll countering controller 106, one or more vehicle thrusters 108, and a roll warning indicator 110.

Sensor 104 of system 100 may be operable to monitor one or more parameters of a vehicle (e.g., vehicle 102), and to record data associated with (e.g., values for) the monitored one or more parameters, if appropriate. The data associated with one or more vehicle parameters recorded by sensor 104 may be recorded on a substantially continuous basis or at any other suitable time intervals. Sensor 104 may be operable to communicate the data associated with one or more vehicle parameters to roll countering controller 106, or sensor 104 may be operable to store the data associated with one or more vehicle parameters such that it can be accessed by roll countering controller 106, as described in further detail below. As just a few examples, sensor 104 may be any suitable combination of an inclinometer, an inertial measurement unit (IMU), an inertial navigation unit (INU), and any other suitable sensor operable to record data associated with one or more vehicle parameters. Although a single sensor 104 is depicted and primarily described, the present invention contemplates that the one or more vehicle parameters may be monitored any suitable number of appropriate sensors.

In certain embodiments, the one or more vehicle parameters monitored by sensor 104 may include the roll angle of a vehicle and the roll rate of a vehicle. The roll angle of the vehicle may be defined as the angle of deflection about the line of travel of the vehicle relative to horizontal. For example, a vehicle sitting with all wheels on level ground may have a zero degree roll angle. Furthermore, a vehicle sitting with all wheels on ground having a twenty-degree slope may have a roll angle between positive twenty degrees and negative twenty degrees, depending on the line of travel of the vehicle (the roll angle being positive or negative to account for direction—clockwise or counter-clockwise—of the roll angle). More particularly, a vehicle sitting with all wheels on ground having a twenty-degree slope and having a line of travel parallel to the slope of the ground (i.e., vehicle is traveling directly uphill or down-hill) may have a zero degree roll angle (as there is no angle of deflection about the line of travel of the vehicle due to the twenty-degree slope of the ground). A vehicle sitting with all wheels on ground having a twenty-degree slope and having a line of travel perpendicular to the slope of the ground (i.e., vehicle is traveling along the slope, neither uphill nor down-hill) may have a twenty-degree roll angle (either positive or negative to account for direction). The roll rate of the vehicle may be defined as the rate of change over time of the roll angle.

In certain embodiments, the one or more vehicle parameters monitored by sensor 104 may include the velocity of the vehicle and the turning radius of the vehicle. Although data associated with each of the vehicle parameters is described as being recorded by sensor 104 such that roll countering application 112 of roll countering controller 106 may access the data (as described below), the present invention contemplates that data associated with one or more vehicle parameters may be recorded by one or more other vehicle systems, and that the data recorded by one or more other vehicle systems may be accessed by roll countering application 112.

The one or more vehicle thrusters 108 of system 100 may be mounted to a vehicle such that they are operable to discharge a particular amount of force in a particular direction upon receiving a signal to discharge (such as from roll countering application 112 of roll countering controller 106, as described below). For example, an up-armored United States Military HMMWV may have eight vehicle thrusters mounted to the roof of the vehicle, four vehicle thrusters on either side, each vehicle thruster operable to discharge a predefined amount of thrust in a direction generally perpendicular to the line of travel of the vehicle. As just one example, vehicle thrusters 108 may be pitch-over motors operable to discharge a particular amount of force such as pitch-over motors manufactured by PACIFIC SCIENTIFIC.

Roll countering controller 106 of system 100 may include any suitable combination of hardware, firmware, and software. In certain embodiments, roll countering controller 106 may include a processing module 114 and a memory module 116. Processing module 114 may include one or more microprocessors, controllers, or any other suitable computing devices or resources. Processing module 114 may work, either alone or with other components of system 100, to provide the functionality of system 100 described herein. Memory module 116 may take the form of volatile or non-volatile memory including, without limitation, magnetic media, optical media, random access memory (RAM), read-only memory (ROM), removable media, or any other suitable memory component.

Memory module 116 may store one or more predefined threshold roll angles and/or roll rates defining the point at which a vehicle is considered close to rollover (as described in further detail below). Memory module 116 may also store one or more predefined maximum allowable roll angles and/or maximum allowable roll rate defining the point at which a vehicle rollover is considered imminent (as described in further detail below). Additionally, memory module 116 may store data related to one or more vehicle dimensions (e.g. vehicle wheelbase, vehicle height, and location of vehicle center of gravity), as described below with regard to FIGS. 4A-4C. Additionally, memory module 116 may store data related the capabilities of the one or more vehicle thrusters 108 of system 100 (location of vehicle thrusters on the vehicle, the angle relative to the vehicle at which each vehicle thruster 108 is operable to discharge a force, and the force each vehicle thruster 108 is operable to discharge), as described below with regard to FIGS. 4A-4C.

In certain embodiments, roll countering controller 106 includes a roll countering application 112. Roll countering application 112 may include any suitable combination of software, hardware, and firmware. Roll countering application 112 may be operable to access information recorded by sensor 104, information stored in memory module 116 of roll countering controller 106, or information stored at any other suitable location. Roll countering application 112 may access data by receiving data (e.g., data communicated by sensor 104), by retrieving data stored in memory module 116 of roll countering controller 106, or by receiving and/or retrieving data in any other suitable manner.

Roll countering application 112 may be operable to access at least some of the data associated with one or more vehicle parameters recorded by sensor 104 (e.g., data associated with the roll angle and the roll rate of a vehicle), as well as data stored in memory module 116 (e.g., threshold roll angle and/or threshold roll rate), to determine if a vehicle is close to rollover.

Roll countering application 112 may determine that a vehicle is close to rollover by comparing data associated with one or more vehicle parameters recorded by sensor 104 with a predefined threshold roll angle, a predefined threshold roll rate, or a predefined threshold roll rate defined based on roll angle (as described in further detail below). The predefined threshold roll angle, the predefined threshold roll rate, and the predefined threshold roll rate defined based on roll angle (each defining the point at which roll countering application 112 determines that a vehicle is close to rollover) may correspond to a point at which a vehicle rollover is possible but avoidable through correction on the part of the vehicle driver.

Roll countering application 112 may determine if a vehicle is close to rollover by comparing accessed roll angle data (recorded by sensor 104) with a predefined threshold roll angle (stored in memory module 116). If the accessed data recorded by sensor 104 indicates a roll angle greater than the predefined threshold roll angle, roll countering application 112 may determine that the vehicle is close to rollover. As a particular example, a roll angle of thirty degrees may be the predefined threshold roll angle. If roll countering application 112 accesses data recorded by sensor 104 indicating a vehicle roll angle of thirty-one degrees, roll countering application 112 may determine, based on a comparison of the accessed data (indicating a roll angle of thirty-one degrees) and the data stored in memory module 116 (predefined threshold roll angle of thirty degrees), that the vehicle is close to rollover.

As an alternative, roll countering application 112 may determine if a vehicle is close to rollover by comparing accessed roll rate data (recorded by sensor 104) with a predefined threshold roll rate (stored in memory module 116). If the accessed roll rate data indicates a roll rate greater than the predefined threshold roll rate, roll countering application 112 may determine that the vehicle is close to rollover. As a particular example, a roll rate of ten degrees per second m ay be the predefined threshold roll rate. If roll countering application 112 accesses data recorded by sensor 104 indicating a vehicle roll rate of eleven degrees per second, roll countering application 112 may determine, based on a comparison of the accessed data (indicating a roll rate of eleven degrees per second) and the data stored in memory module 116 (predefined threshold roll rate of ten degrees per second), that the vehicle is close to rollover.

As an additional alternative, roll countering application 112 may determine if a vehicle is close to rollover by comparing a combination of accessed roll angle and roll rate data (recorded by sensor 104) to a predefined threshold roll rate, the predefined threshold roll rate being defined based on the accessed roll angle. In other words, the predefined threshold roll rate may vary depending on the accessed roll angle. Memory module 116 may store a table of threshold roll rates associated with particular roll angles. Additionally or alternatively, memory module 116 may store an equation to be evaluated by roll countering application 116, the equation defining threshold roll rates based on roll angle. In other words, roll countering application 116 may calculate a threshold roll rate for a given roll angle. The relationship between threshold roll rate and roll angle may be linear or non-linear, and the relationship may be specific to a particular vehicle (i.e. a threshold roll rate for a particular roll angle may be more or less depending on the vehicle).

As a particular example, a roll angle of twenty degrees may yield (based a table stored in memory module 116 and/or an equation stored in memory module 116) a threshold roll rate of ten degrees per second. If roll countering application 112 accesses data recorded by sensor 104 indicating a roll angle of twenty degrees and a roll rate of eleven degrees per second, roll countering application 112 may determine, based on a comparison of the accessed data (indicating roll angle of twenty degrees and a roll rate of eleven degrees per second) and the data stored in memory module 116 (predefined threshold roll rate of ten degrees per second at a roll angle of twenty degrees), that the vehicle is close to rollover. Although a particular relationship between threshold roll rate and roll angle has been primarily described, the present invention contemplates any suitable relationship.

The determination of the predefined threshold roll angles and/or roll rates at which roll countering application 116 determines that a vehicle is close to rollover (as described above) is described in further detail below with regard to FIGS. 4-6. Furthermore, the predefined threshold roll angles and/or roll rates at which roll countering application 116 determines that a vehicle is close to rollover may be specific to a particular vehicle (i.e. the predefined maximum allowable roll angles and/or roll rates may be more or less depending on the vehicle).

In response to a determination that a vehicle is close to rollover, roll countering application 112 may communicate a signal, either directly or indirectly, to roll warning indicator 110. In certain embodiments, roll warning indicator 110 is a light in the vehicle cabin in view of the vehicle driver and/or an audible warning such that the vehicle driver is notified of the determination that the vehicle is close to rollover. This warning may give the vehicle driver an opportunity to attempt to manually avoid the vehicle rollover. Although these example roll warning indicators 110 are primarily described, the present invention contemplates any suitable roll warning indicator 110, according to particular needs.

Roll countering application 112 may be operable to access at least some of the data associated with one or more vehicle parameters recorded by sensor 104 (e.g., data associated with the roll angle and the roll rate of a vehicle), as well as data stored in memory module 116 (e.g., maximum allowable roll angle and maximum allowable roll rate), to determine if a vehicle rollover is imminent.

Roll countering application 112 may determine that a vehicle rollover is imminent by comparing data associated with one or more vehicle parameters recorded by sensor 104 with a predefined maximum allowable roll angle, a predefined maximum allowable roll rate, or a predefined maximum allowable roll rate defined based on roll angle (as described in further detail below). The predefined maximum allowable roll angle, the predefined maximum allowable roll rate, and the predefined maximum allowable roll rate defined based on roll angle (each defining the point at which roll countering application 112 determines that a vehicle rollover is imminent) may correspond to a point at which a vehicle rollover is likely and unavoidable through correction on the part of the vehicle driver.

Roll countering application 112 may determine if a vehicle rollover is imminent by comparing accessed roll angle data (recorded by sensor 104) with a predefined maximum allowable roll angle (stored in memory module 116). If the accessed data recorded by sensor 104 indicates a roll angle greater than the predefined maximum allowable roll angle, roll countering application 112 may determine that the vehicle is close to rollover. As a particular example, a roll angle of forty degrees may be the predefined maximum allowable roll angle. If roll countering application 112 accesses data recorded by sensor 104 indicating a vehicle roll angle of forty-one degrees, roll countering application 112 may determine, based on a comparison of the accessed data (indicating a roll angle of forty-one degrees) and the data stored in memory module 116 (predefined maximum allowable roll angle of forty degrees), that a vehicle rollover is imminent.

As an alternative, roll countering application 112 may determine if a vehicle rollover is imminent by comparing accessed roll rate data (recorded by sensor 104) with a predefined maximum allowable roll rate (stored in memory module 116). If the accessed roll rate data indicates a roll rate greater than the predefined maximum allowable roll rate, roll countering application 112 may determine that the vehicle is close to rollover. As a particular example, a roll rate of twenty degrees per second may be the predefined maximum allowable roll rate. If roll countering application 112 were to access data recorded by sensor 104 indicating a vehicle roll rate of twenty-one degrees per second, roll countering application 112 may determine, based on a comparison of the accessed data (indicating a roll rate of twenty-one degrees per second) and the data stored in memory module 116 (predefined maximum allowable roll rate of twenty degrees per second), that a vehicle rollover is imminent.

As an additional alternative, roll countering application 112 may determine if a vehicle rollover is imminent by comparing a combination of accessed roll angle and roll rate data (recorded by sensor 104) to a predefined maximum allowable roll rate, the predefined maximum allowable roll rate being defined based on the accessed roll angle. In other words, the predefined maximum allowable roll rate may vary depending on the accessed roll angle. Memory module 116 may store a table of maximum allowable roll rates associated with particular roll angles. Additionally or alternatively, memory module 116 may store an equation to be evaluated by roll countering application 116, the equation defining maximum allowable roll rates based on roll angle. In other words, roll countering application 116 may calculate a maximum allowable roll rate for a given roll angle. The relationship between maximum allowable roll rate and roll angle may be linear or non-linear, and the relationship may be specific to a particular vehicle (i.e. a maximum allowable roll rate for a particular roll angle may be more or less depending on the vehicle).

As a particular example, a roll angle of twenty degrees may yield (based a table stored in memory module 116 and/or an equation stored in memory module 116) a maximum allowable roll rate of twenty degrees per second. If roll countering application 112 accesses data recorded by sensor 104 indicating a roll angle of twenty degrees and a roll rate of twenty-one degrees per second, roll countering application 112 may determine, based on a comparison of the accessed data (indicating roll angle of twenty degrees and a roll rate of twenty-one degrees per second) and the data stored in memory module 116 (predefined maximum allowable roll rate of twenty degrees per second at a roll angle of twenty degrees), that a vehicle rollover is imminent. Although a particular relationship between maximum allowable roll rate and roll angle has been primarily described, the present invention contemplates any suitable relationship.

The determination of the predefined maximum allowable roll angles and/or roll rates at which roll countering application 116 determines that a vehicle rollover is imminent(as described above) is described in further detail below with regard to FIGS. 4-6. Furthermore, the predefined maximum allowable roll angles and/or roll rates at which roll countering application 116 determines that a vehicle rollover is imminent may be specific to a particular vehicle (i.e. the predefined maximum allowable roll angles and/or roll rates may be more or less depending on the vehicle).

Roll countering application 112, having determined that a vehicle rollover is imminent (as described above), may determine a roll countering solution based at least in part on accessed data recorded by sensor 104. The roll countering solution may include the direction of force needed to counter the imminent vehicle rollover, the direction of force and the number of vehicle thrusters needed to counter the imminent vehicle rollover, or the direction of force and approximate amount of force needed to counter the imminent vehicle rollover (as described in further detail below). Countering the imminent vehicle rollover may include canceling the imminent vehicle rollover or otherwise slowing the imminent vehicle rollover.

Roll countering application 112 may be further operable determine one or more appropriate vehicle thrusters 108 to execute the determined roll countering solution and signal, either directly or indirectly, the one or more appropriate vehicle thrusters 108 to discharge to execute the determined roll countering solution. To facilitate the determination of the one or more appropriate vehicle thrusters 108 to execute the determined roll countering solution, memory module 116 of rollover cancellation controller 106 may store information associated with the one or more vehicle thrusters 108 of system 100. The information associated with the one or more vehicle thrusters 108 stored in memory module 116 may include the force each vehicle thruster 108 is capable of discharging, the direction of the force each vehicle thruster 108 is capable of discharging, and the location of each vehicle thruster 108 on the vehicle.

In embodiments in which the roll countering solution includes the direction of force needed to counter the imminent vehicle rollover, roll countering application 116 may access roll rate and/or roll rate data recorded by sensor 104 and determine the direction of the imminent vehicle rollover (based on whether the accessed roll rate and/or roll rate data is positive or negative, positive or negative indicating direction). Having determined the direction of the imminent vehicle rollover, roll countering application 116 may determine the direction of force needed to counter the imminent vehicle rollover (direction opposite the vehicle rollover). Roll countering application 112 may then access information associated with the one or more vehicle thrusters 108 (stored in memory module 116) to determine one or more appropriate vehicle thrusters 108 to execute the determined roll countering solution (i.e., those vehicle thrusters 108 operable to discharge a force in the direction of the determined roll countering solution). Roll countering application 112 may then signal, either directly or indirectly, the one or more appropriate vehicle thrusters 108 to discharge to execute the determined roll countering solution.

In embodiments in which the roll countering solution includes the direction of force and the number of vehicle thrusters needed to counter the imminent vehicle rollover, roll countering application 112 may determine the direction of force needed to counter the imminent vehicle rollover (as described above). Roll countering application 116 may then determine the number of vehicle thruster needed to counter the imminent vehicle rollover by comparing the accessed roll angle and/or roll rate data with predetermined roll angle and/or roll rate ranges corresponding to a predefined number of vehicle thrusters (stored in memory module 116). As a particular example, memory module 116 may store predetermined ranges of roll rates corresponding to a specified number of vehicle thrusters. Furthermore, if the maximum allowable roll rate were twenty-degrees per second (defining the point at which the determination is made that a vehicle rollover is imminent, as described above), the roll countering solution may include one vehicle thruster for an accessed roll rate between twenty and twenty-five degrees per second, two vehicle thruster for an accessed roll rate between twenty-five and thirty degrees per second, etc. Roll countering application 112 may then access information associated with the one or more vehicle thrusters 108 (stored in memory module 116) to determine one or more appropriate vehicle thrusters 108 to execute the determined roll countering solution (i.e., the determined number of vehicle thrusters 108 operable to discharge a force in the determined direction). Roll countering application 112 may then signal, either directly or indirectly, the one or more appropriate vehicle thrusters 108 to discharge to execute the determined roll countering solution.

In embodiments in which the roll countering solution includes the direction of force and approximate amount of force needed to counter the imminent vehicle rollover, roll countering application 112 may access data recorded by sensor 104 (vehicle roll angle, vehicle roll rate, vehicle velocity, and vehicle turn radius), information associated with one or more vehicle dimensions (e.g. vehicle mass, location of vehicle center of gravity), and one or more rollover equations of motion (e.g., equations 1-7 described with regard to FIG. 4, below). The information associated with one or more vehicle dimensions and the one or more rollover equations of motion may be stored in memory module 116 of roll countering application 106 or at ay other suitable location in system 100.

Based upon the accessed data recorded by sensor 104, information associated with one or more vehicle dimensions, and one or more rollover equations of motion, roll countering application 112 may approximate the centripetal force (force resulting from a vehicle turn) acting on the vehicle center of mass (see Equation 1 described below with regard to FIG. 4). Roll countering application 112 may also approximate the moment force due to a vehicle turn about the roll pivot point (the vehicle wheel(s) remaining on the ground during the roll) resulting from the centripetal force (see Equation 2 described below with regard to FIG. 4). Roll countering application 112 may also approximate the moment force resulting from the weight of the vehicle acting on the vehicle center of mass (see Equation 4 described below with regard to FIG. 4).

Roll countering application 112 may approximate the total moment force acting on the vehicle by summing the moment force due to the turn and the moment force due to gravity. In certain embodiments, to cancel the roll, the total moment force acting on the vehicle (sum of the moment force due to a vehicle turn and the moment force resulting from the weight of the vehicle) may need to be countered (i.e., the roll countering solution may need to include an amount of force from the one or more vehicle thrusters 108 at least great enough to create a countering moment force equal to the calculated total vehicle moment force). Based on the determined approximate countering moment force needed to be produced by the one or more vehicle thrusters 108, roll countering application 112 may further approximate the minimum total force needed o counter the imminent vehicle rollover (see Equation 7 described below with regard to FIG. 4). Furthermore, whether the determined force is positive or negative will indicate the appropriate direction of force to counter the imminent vehicle rollover.

Roll countering application 112 may then access information associated with the one or more vehicle thrusters 108 (stored in memory module 116) to determine one or more appropriate vehicle thrusters 108 to execute the determined roll countering solution (i.e., those vehicle thrusters 108 operable to discharge the appropriate amount of force in the direction of the determined roll countering solution).

As a particular example, the roll countering solution may include a force of positive 15,000 pounds (lbs). Furthermore, the vehicle may have eight vehicle thrusters, four of the vehicle thrusters each capable of producing a thrust force of positive 5,000 lbs and the other four vehicle thrusters each capable of producing a thrust force of negative 5,000 lbs (where positive and negative indicate direction). To execute the roll countering solution (15,000 lbs of force in the positive direction), the roll countering application 112 may determine that three of the four vehicle thrusters operable to discharge positive 5,000 lbs are needed to execute the determined roll countering solution. Having determining the appropriate vehicle thrusters to discharge, roll countering application 112 may then signal, either directly or indirectly, the appropriate vehicle thrusters to discharge to execute the determined roll countering solution.

Although a particular implementation of system 100 is illustrated and primarily described, the present invention contemplates any suitable implementation of system 100 according to particular needs. Although a particular number components of system 100 have been illustrated and primarily described above, the present invention contemplates system 100 including any suitable number of such components. Furthermore, the various components of system 100 described above may be local or remote from one another.

In operation of an example embodiment of system 100, a determination is made (e.g., by a driver of the vehicle) whether to power up the roll cancellation system. The determination of whether to power up the roll cancellation system may be an automatic response to the driver starting the vehicle, a response to explicit driver activation of the roll cancellation system, or any other suitable response according to particular needs.

If a determination is made to power up the roll cancellation system, roll countering application 112 accesses data associated with one or more vehicle parameters (e.g., roll angle and roll rate), the data associated with one or more vehicle parameters recorded sensor 104. Roll countering application 112 may access data corresponding to one or more vehicle parameters may be accessed continuously or at any suitable time intervals (e.g., every one-hundredth of a second).

Roll countering application 112 then determines, based on the data associated with one or more vehicle parameters, if the vehicle is close to rollover. Roll countering application 112 may determine that a vehicle is close to rollover by comparing the accessed roll angle with a predetermined threshold roll angle above which the vehicle is considered close to rollover, by comparing the accessed roll rate with a predetermined threshold roll rate above which the vehicle is considered close to rollover, by comparing the accessed roll rate to a calculated threshold roll rate above which the vehicle is considered close to rollover (the calculated threshold roll rate being calculated based on the accessed roll angle and a predefined formula), or any other suitable means. If roll countering application 112 determines that the vehicle is close to rollover, roll countering application 112 signals warning indicator 110 (e.g., a light in the vehicle cabin in view of the vehicle driver and/or an audible warning) such that the vehicle driver is notified of the determination that the vehicle is close to rollover. This warning may give the vehicle driver an opportunity to attempt to manually avoid the vehicle rollover. In addition, the method continues to step 310.

Roll countering application 112 then determines if a vehicle rollover is imminent. Roll countering application 112 may determine if a vehicle rollover is imminent by comparing the accessed vehicle roll angle with a predetermined maximum allowable roll angle (stored in memory module 116), by comparing the accessed vehicle roll rate with a predetermined maximum allowable roll rate (stored in memory module 116), by comparing the accessed vehicle roll rate with a calculated maximum allowable roll rate (calculated based on the roll angle and a predefined equation defining the relationship between maximum allowable roll rate and roll angle stored in memory module 116), or by any other suitable means.

If roll countering application 112 determines that a vehicle rollover is imminent, roll countering application 112 determines a roll countering solution based upon at least in part on the accessed data recorded by sensor 104 (e.g., roll angle and roll rate) and information stored in memory module 116 (e.g. capabilities on vehicle thrusters 108 and/or vehicle dimensions). In certain embodiments, the roll countering solution may comprise a direction that a countering force needs to be applied to counter the imminent vehicle rollover. In certain other embodiments, the roll countering solution may comprise the direction and the appropriate number of vehicle thrusters needed to counter the vehicle rollover (the appropriate number of vehicle thrusters being determined based on a comparison of the accessed roll angle and/or roll rate data and predetermined roll angle and/or roll rate ranges corresponding to a predefined number of vehicle thrusters). In certain other embodiments, the roll countering solution may include both the direction and approximate amount of force needed to counter the imminent vehicle rollover (the direction and approximate amount of force needed being determined by calculating the approximate force needed to counter the roll based on accessed data recorded by sensor 104, vehicle parameters stored in memory module 116, and rollover equations of motion stored in memory module 116).

Roll countering application 112 then accesses information corresponding to the capabilities of the one or more vehicle thrusters 108 stored in memory module 116 to determine one or more vehicle thrusters 108 to execute the determined roll countering solution. For example, in embodiments having a roll countering solution comprising the direction of force to be discharged and the appropriate number of vehicle thrusters, roll countering application 112 may access the capabilities of the one or more vehicle thrusters 108 stored in memory module 116 to determine which of the one or more vehicle thrusters 108 is operable to discharge a force in the appropriate direction and select the appropriate number of vehicle thrusters 108. As an additional example, in embodiments having a roll countering solution comprising both the direction and amount of force needed to counter the imminent vehicle rollover, roll countering application 112 may access the capabilities of the one or more vehicle thrusters 108 stored in memory module 116 (including the amount of force each vehicle thruster is operable to discharge) and select the appropriate combination of vehicle thrusters 108 to discharge the required force in the required direction.

Roll countering application 112 then signals, either directly or indirectly, the one or more vehicle thrusters 108 to discharge to execute the determined roll countering solution.

Particular embodiments of the present invention may provide one or more technical advantages. Vehicles may be susceptible to a vehicle rollover depending on operating conditions of the vehicle, with some vehicles being more susceptible than others. Vehicles having a high center of gravity, for example, may have an increased likelihood of experiencing a vehicle rollover, especially during cornering. As a particular example, a United Stated Military High Mobility Multi-purpose Wheeled Vehicle (HMMWV) that has been outfitted with additional armor ("up-armored") may have an increased vehicle weight as well as a raised vehicle center of gravity. The raised center of gravity of the HMMWV may increase the likelihood that the vehicle will experience a vehicle rollover during cornering, which is especially dangerous if the vehicle is outfitted with a roof mounted machine gun (as the vehicle may roll over on the military personnel operating the roof mounted machine gun).

Conventional techniques for preventing vehicle rollover are typically preemptive. In other words, conventional techniques for preventing vehicle rollover may involve outfitting a vehicle in such as way as to attempt to prevent a vehicle rollover from occurring (e.g., by modifying the vehicle suspension) or training drivers to operate the vehicle in such a way as to attempt to avoid a vehicle rollover from occurring. Conventional techniques, however, are inadequate in that they are not responsive to a particular vehicle rollover once the vehicle rollover has started. The present invention provides the capability to respond to a particular vehicle rollover once the vehicle rollover has started by detecting the point at which a vehicle is close to rollover and warning the driver such that the driver may have an opportunity to avoid a vehicle rollover. Furthermore, the present invention provides the capability to respond to a particular vehicle rollover once the vehicle rollover has started by detecting the point at which a vehicle rollover is imminent and initiating the discharge of a force to counter the vehicle rollover, thereby increasing vehicle safety.

Figure 3:
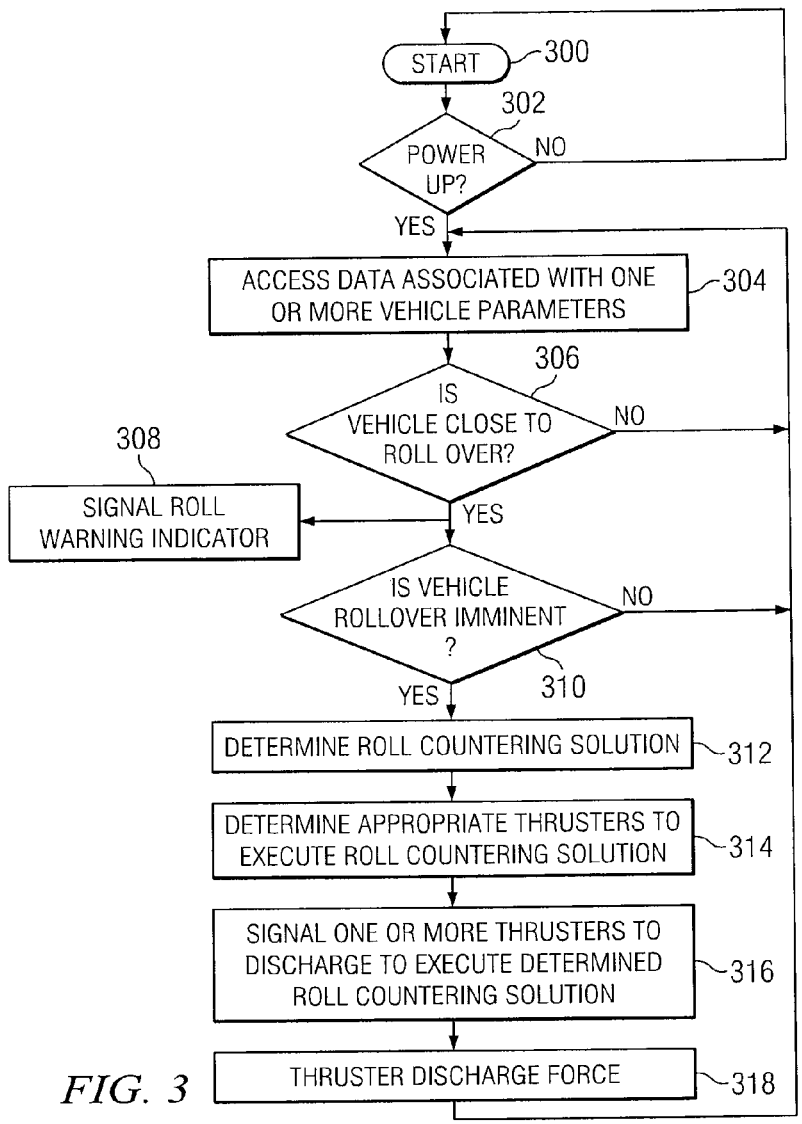
FIG. 3 illustrates an example method for performing dynamic rollover prevention, according to certain embodiments of the present invention.

FIG. 3 illustrates an example method for performing dynamic vehicle roll cancellation, according to certain embodiments of the present invention. The method begins at step 300. At step 302, a determination is made (e.g., by a driver of the vehicle) whether to power up the roll cancellation system. The determination of whether to power up the roll cancellation system may be an automatic response to the driver starting the vehicle, a response to explicit driver activation of the roll cancellation system, or any other suitable response according to particular needs. If a determination is made to power up the roll cancellation system, the method continues to step 304.

At step 304, roll countering application 112 accesses data associated with one or more vehicle parameters (e.g., roll angle and roll rate), the data associated with one or more vehicle parameters recorded sensor 104. Roll countering application 112 may access data corresponding to one or more vehicle parameters may be accessed continuously or at any suitable time intervals (e.g., every one-hundredth of a second).

At step 306, roll countering application 112 determines, based on the data associated with one or more vehicle parameters, if the vehicle is close to rollover. Roll countering application 112 may determine that a vehicle is close to rollover by comparing the accessed roll angle with a predetermined threshold roll angle above which the vehicle is considered close to rollover, by comparing the accessed roll rate with a predetermined threshold roll rate above which the vehicle is considered close to rollover, by comparing the accessed roll rate to a calculated threshold roll rate above which the vehicle is considered close to rollover (the calculated threshold roll rate being calculated based on the accessed roll angle and a predefined formula), or any other suitable means. If roll countering application 112 determines that the vehicle is not close to rollover, the method returns to step 304 and roll countering application 112 again accesses data recorded by sensor 104. If roll countering application 112 determines that the vehicle is close to rollover, the method continues to step 308. At step 308, roll countering application 112 signals warning indicator 110 (e.g., a light in the vehicle cabin in view of the vehicle driver and/or an audible warning) such that the vehicle driver is notified of the determination that the vehicle is close to rollover. This warning may give the vehicle driver an opportunity to attempt to manually avoid the vehicle rollover. In addition, the method continues to step 310.

At step 310, roll countering application 112 determines if a vehicle rollover is imminent. Roll countering application 112 may determine if a vehicle rollover is imminent by comparing the accessed vehicle roll angle with a predetermined maximum allowable roll angle (stored in memory module 116), by comparing the accessed vehicle roll rate with a predetermined maximum allowable roll rate (stored in memory module 116), by comparing the accessed vehicle roll rate with a calculated maximum allowable roll rate (calculated based on the roll angle and a predefined equation defining the relationship between maximum allowable roll rate and roll angle stored in memory module 116), or by any other suitable means. If roll countering application 112 determines that vehicle rollover is not imminent, the method returns to step 304. If roll countering application 112 determines that a vehicle rollover is imminent, the method continues to step 312.

At step 312, roll countering application 112 determines a roll countering solution based upon at least in part on the accessed data recorded by sensor 104 (e.g., roll angle and roll rate) and information stored in memory module 116 (e.g. capabilities on vehicle thrusters 108 and/or vehicle dimensions). In certain embodiments, the roll countering solution may comprise a direction that a countering force needs to be applied to counter the imminent vehicle rollover. In certain other embodiments, the roll countering solution may comprise the direction and the appropriate number of vehicle thrusters needed to counter the vehicle rollover (the appropriate number of vehicle thrusters being determined based on a comparison of the accessed roll angle and/or roll rate data and predetermined roll angle and/or roll rate ranges corresponding to a predefined number of vehicle thrusters). In certain other embodiments, the roll countering solution may include both the direction and approximate amount of force needed to counter the imminent vehicle rollover (the direction and approximate amount of force needed being determined by calculating the approximate force needed to counter the roll based on accessed data recorded by sensor 104, vehicle parameters stored in memory module 116, and rollover equations of motion stored in memory module 116). Countering the imminent vehicle rollover may include canceling the imminent vehicle rollover or otherwise slowing the imminent vehicle rollover.

At step 314, roll countering application 112 accesses information corresponding to the capabilities of the one or more vehicle thrusters 108 stored in memory module 116 to determine one or more vehicle thruster 108 to execute the determined roll countering solution. For example, in embodiments having a roll countering solution comprising the direction of force to be discharged and the appropriate number of vehicle thrusters, roll countering application 112 may access the capabilities of the one or more vehicle thrusters 108 stored in memory module 116 to determine which of the one or more vehicle thrusters 108 is operable to discharge a force in the appropriate direction and select the appropriate number of vehicle thrusters 108. As an additional example, in embodiments having a roll countering solution comprising both the direction and amount of force needed to counter the imminent vehicle rollover, roll countering application 112 may access the capabilities of the one or more vehicle thrusters 108 stored in memory module 116 (including the amount of force each vehicle thruster is operable to discharge) and select the appropriate combination of vehicle thrusters 108 to discharge the required force in the required direction.

At step 316, roll countering application 112 signals, either directly or indirectly, the appropriate one or more vehicle thrusters 108 to discharge to execute the determined roll countering solution. At step 318, the one or more appropriate vehicle thrusters 108 discharge in response to the signal from roll countering application 112. Once the one or more appropriate vehicle thruster 108 have discharged, the method returns to step 304 and roll countering application 112 accesses another set of data related to one or more vehicle parameters recorded by sensor 104.

Figure 4A:
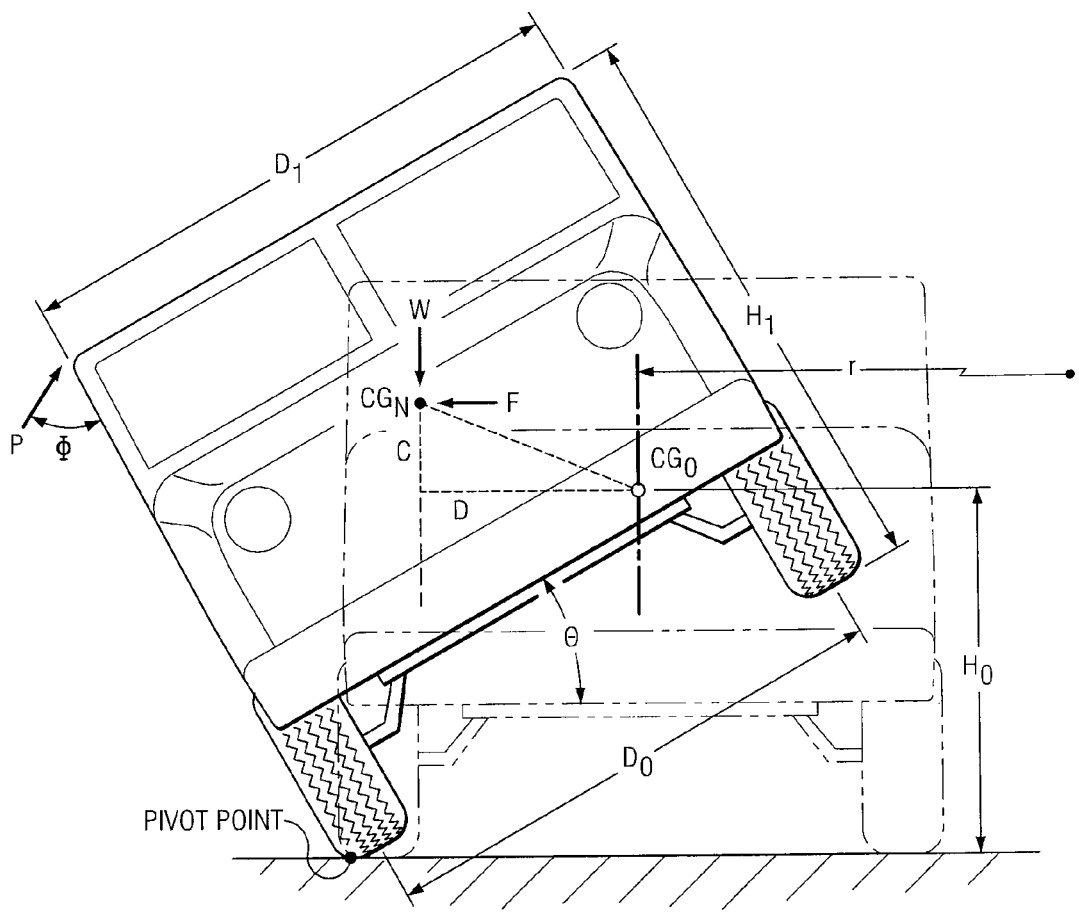
FIGS. 4A-4C illustrate an example vehicle experiencing an example vehicle rollover and the geometry associated with vehicle rollover.
Figure 4B:
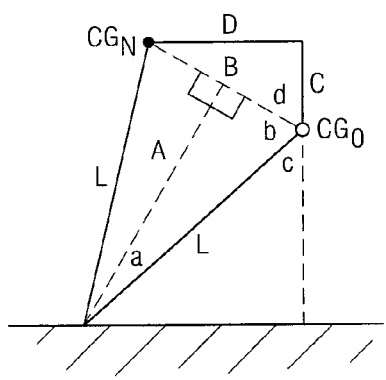
Figure 4C:
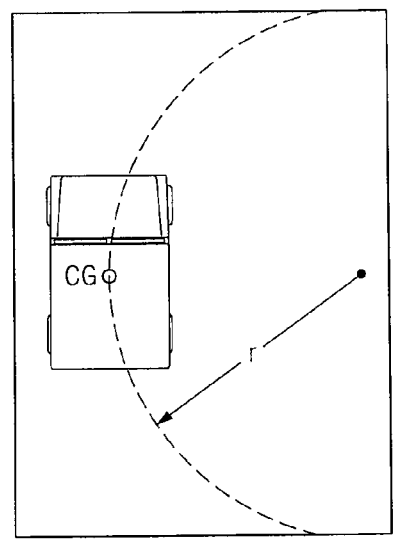

FIGS. 4A-4C illustrate an example vehicle experiencing an example vehicle rollover and the geometry associated with vehicle rollover. The depicted geometry (which is vehicle specific and may be stored in memory module 116 of roll countering controller 106), along with data recorded by sensor 104, may enable roll countering application 112 to calculate a roll countering solution, as described above with regard to FIG. 2. Additionally, the depicted geometry may be utilized in determining predefined threshold roll angles and/or roll rates (stored in memory module 116 of roll countering controller 106, as described above with regard to FIG. 2) defining the point at which a vehicle is determined to be close to rollover and predefined maximum allowable roll angles/roll rates (stored in memory module 116 of roll countering controller 106, as described above with regard to FIG. 2) defining the point at which a vehicle rollover is determined to be imminent. Although a particular vehicle rollover and associated vehicle geometry are depicted and primarily described, the present invention contemplates any suitable geometry associated with any vehicle rollover.

In the depicted vehicle rollover, $\Theta$ represents the vehicle roll angle, $CG_O$ represents the location of the vehicle original center of gravity (center of gravity with $\Theta$ equal to zero), $CG_N$ represents the location of the vehicle center of gravity accounting for movement due to a roll angle $\Theta$, r represents the vehicle turn radius, D represents the horizontal movement of the vehicle center of gravity due to roll angle $\Theta$, and C represents the vertical movement of the vehicle center of gravity due to roll angle $\Theta$. Furthermore, W represents the gravitational force due to the vehicle weight acting on the vehicle center of gravity, F represents the centripetal force due to the vehicle turn acting on the vehicle center of gravity, P represents the force resulting from the discharge of one or more vehicle thrusters 108, and $\Phi$ represents the angle at which the vehicle thruster force is applied relative to the vehicle. Furthermore, $H_O$ represents the vertical height of the vehicle center of gravity when $\Theta$ equal zero ($CG_O$), $H_1$ represents the overall height at which force P is applied by one or more vehicle thrusters 108 (which corresponds to the height of height of the vehicle as the one or more vehicle thrusters are mounted to the roof of the vehicle in the illustrated embodiment), $D_O$ represents the wheelbase of the vehicle, and $D_1$ represents the horizontal distance between the point at which the vehicle thrusters 108 on either side of the vehicle are mounted (which corresponds to the overall vehicle width as the vehicle thrusters 108 are mounted such that they are operable to discharge a force at the out edge of the vehicle in the illustrated embodiment).

In certain embodiments, roll countering application 112 of a roll countering controller 106 may be operable to determine a roll countering solution comprising the direction and amount of force needed to counter a vehicle rollover. Roll countering application 112 may determine the roll countering solution based on accessed data recorded by sensor 104 (vehicle velocity V, vehicle turn radius r, and vehicle roll angle $\Theta$) and accessed data associated with various vehicle dimensions stored in memory module 116 ($D_O$, $D_1$, $H_O$, $H_1$, $\Phi$, and W). Taking into account the accessed data, roll countering application 112 may perform the following example calculations to determine a roll countering solution (including the force P required to counter the vehicle rollover):

$$F = \frac{W \cdot V^2}{g \cdot r} \qquad \text{Equation 1}$$

where g is the gravity constant. Having determined the force F due to the vehicle turn (acting, on $CG_N$), roll countering application 112 may determine the moment about the roll pivot point (moment=(force)*(lever arm)) created by the vehicle turn according to Equation 2.

$$F_{MOMENT} = F \cdot (H_O + C) \qquad \text{Equation 2}$$

where $F_{MOMENT}$ is the moment created by the centripetal turn force F about the roll pivot point (the wheel(s) about which the vehicle rollover is occurring) taking into account the increase in height of $CG_N$ over $CG_O$ ($F_{MOMENT}$ has been defined as positive, meaning that moments acting in the counter-clockwise direction about the roll pivot point will be considered positive). Furthermore, F is acting in the horizontal plane, so the lever arm ($H_O + C$) is the vertical distance from the pivot point to $CG_N$. C may be calculated by roll countering application 112 based on the following parameters (some of which constitute vehicle dimensions and are accessed from memory module 116 by roll countering application 112 and some of which are calculated by roll countering application 112 based on accessed roll angle $\Theta$ recorded by sensor 104):

$$a = \frac{\Theta}{2}$$

$$b = 180 - 90 - a = 90 - \frac{\Theta}{2}$$

$$c = \tan^{-1}\left(\frac{D_O}{2 \cdot H_O}\right)$$

$$d = 180 - b - c = 90 + \frac{\Theta}{2} - \tan^{-1}\left(\frac{D_O}{2 \cdot H_O}\right)$$

$$B = 2 \cdot L \cdot \sin\left(\frac{\Theta}{2}\right)$$

where c is the angle between the vertical and a line connecting $CG_O$ and the roll pivot point (vehicle dimension that may be stored in a memory module 116). Furthermore, roll countering application 112 may calculate parameters a, b, and d based $\Theta$ associated with a particular vehicle rollover and particular vehicle dimensions ($D_O$ and $H_O$). Furthermore, B is the linear distance from $CG_O$ to $CG_N$, defined by $\Theta$ and L (L being the distance from the pivot point to the vehicle center of gravity, L being a vehicle dimension that may be stored in a memory module 116 of the roll countering controller 106). Based on these parameters, roll countering application 112 may calculate C (vertical movement of the vehicle center of gravity due to roll angle $\Theta$) for a particular vehicle rollover using Equation 3.

$$C = B \cdot \cos(d) \qquad \text{Equation 3}$$

Similarly, roll countering application 112 may calculate $W_{MOMENT}$ (the moment about the roll pivot point created by the vehicle weight acting on $CG_N$) using Equation 4.

$$-W_{MOMENT} = W \cdot \left(\frac{D_O}{2} - D\right) \qquad \text{Equation 4}$$

where W is acting in the vertical plane so the lever arm ($D_O/2 - D$) used in calculating $W_{MOMENT}$ is the horizontal distance from the roll pivot point to $CG_N$ ($W_{MOMENT}$ is negative because it is acting in a clockwise direction about the roll pivot point, and counter clockwise has been defined as positive as described above) with D being the horizontal distance between $CG_O$ and $CG_N$.

Similarly, roll countering application 112 may calculate D (horizontal movement of the vehicle center of gravity due to roll angle $\Theta$) according to Equation 5.

$$D = B \cdot \cos(d) \quad \text{Equation 5}$$

Roll countering application 122, having determined each of the moments acting on the vehicle for a particular vehicle rollover ($F_{MOMENT}$ and $W_{MOMENT}$), may then sum each of the moments about the roll pivot point. The moment provided by force discharged by the one or more vehicle thrusters ($P_{MOMENT}$, defined below) may counteract the total moment, meaning in the above described example that:

$$(P_{MOMENT}) \geqq (F_{MOMENT}) - (W_{MOMENT})$$

where $P_{MOMENT}$ is defined by Equation 6.

$$P_{MOMENT} = \left[ P \cdot \sin(\Phi) \cdot \left( \frac{D_1 - D_O}{2} \right) \right] + \left[ \begin{array}{c} P \cdot \cos(\Phi) \cdot \\ (H_1 - H_O) \end{array} \right] \quad \text{Equation 6}$$

where $P \sin(\Phi)$ represents the component of thrust P acting on the horizontal plane with respect to the vehicle, and is thus the moment arm on which that force is acting is the vertical distance from the from the vehicle center of gravity to the mounting point of the vehicle thruster (a vehicle dimension that may be stored in memory module 116 of roll countering controller 106). Similarly, $P \cos(\Phi)$ represents the component of thrust P acting on the vertical plane with respect to the vehicle, and is thus the moment arm on which that force is acting is the horizontal distance from the vehicle center of gravity to the mounting point of the vehicle thruster (a vehicle dimension that may be stored in memory module 116 of roll countering controller 106).

Roll countering application 112 may then determine the roll countering solution (the total force P needed to counter the moment forces created by the turn force and the weight of the vehicle and the direction that the thrust needs to be applied) according to Equation 7.

$$P = \left[ \frac{(F_{MOMENT}) - (W_{MOMENT})}{\left( \sin(\Phi) \cdot \left( \frac{D_1 - D_O}{2} \right) \right) + (\cos(\Phi) \cdot (H_1 - H_0)))} \right] \quad \text{Equation 7}$$

where whether P is positive or negative will indicate the direction the force needs to be discharged.

Roll countering application 112, having determined the roll countering solution (the calculated force P needed to counter the moment forces created by the turn force and the weight of the vehicle and the direction that the force needs to be applied), may determine one or more vehicle thrusters 108 to execute the determined roll countering solution. To determine one or more vehicle thrusters 108 to execute the determined roll countering solution, roll countering application 112 may access information associated with the one or more vehicle thrusters 108 of system 100. The information associated with the one or more vehicle thrusters 108 may include the force each vehicle thruster 108 is capable of discharging, the direction of the force each vehicle thruster 108 is capable of discharging, and the location of each vehicle thruster 108 on the vehicle). Roll countering application 112 may then select appropriate vehicle thruster to discharge to execute the determined roll countering solution.

As a particular example, the roll countering solution may include a force of positive 15,000 pounds (lbs). Furthermore, the vehicle may have eight vehicle thrusters, four of the vehicle thrusters each capable of producing a thrust force of positive 5,000 lbs and the other four vehicle thrusters each capable of producing a thrust force of negative 5,000 lbs (where positive and negative indicate direction). To execute the roll countering solution (15,000 lbs of force in the positive direction), the roll countering controller may determine that three of the four vehicle thrusters operable to discharge positive 5,000 lbs are needed to execute the determined roll countering solution. After determining the appropriate vehicle thrusters to discharge, roll countering application 112 may then signal, either directly or indirectly, the appropriate vehicle thrusters to discharge to execute the determined roll countering solution.

As an alternative to determining a roll countering solution including the total force P needed to counter the moment forces created by the turn force and the weight of the vehicle (as described above), roll countering application 112 may determine a roll countering solution including the $P_{MOMENT}$ needed to counter the moment forces created by the turn force and the weight of the vehicle.

Roll countering application 112, having determined the roll countering solution (including the $P_{MOMENT}$ needed to counter the moment forces created by the turn force and the weight of the vehicle and the direction that the moment needs to be applied), may determine one or more vehicle thrusters 108 to execute the determined roll countering solution. To determine one or more vehicle thrusters 108 to execute the determined roll countering solution, roll countering application 112 may access information associated with the one or more vehicle thrusters 108 of system 100. The information associated with the one or more vehicle thrusters 108 may include the moment each vehicle thruster 108 is capable of producing (e.g., by discharging a force) and the direction of the moment each vehicle thruster 108 is capable of discharging. Roll countering application 112 may then select appropriate vehicle thruster to discharge to execute the determined roll countering solution.

The above-described geometry and equations may also be the basis for the derivation of a rollover equation of motion for a particular vehicle. The rollover equation of motion for a particular vehicle may allow roll countering application 112 to determine one or more threshold roll angles and/or roll rates for a particular vehicle (defining either the point at which a particular vehicle is considered close to rollover) and one or more maximum allowable roll angles and/or roll rates (defining the point at which a vehicle rollover is considered imminent). Furthermore, roll countering application 112 may use the rollover equation of motion to determine the appropriate number of vehicle thrusters 108 to be installed on a particular vehicle and the capabilities of those vehicle thruster (e.g., the amount of force each vehicle thruster 108 is operable to discharge and the duration of the discharge).

In addition to the above described parameters, the rollover equation of motion includes a parameter I corresponding to the mass inertia of the vehicle, a parameter K corresponding to the spring stiffness associated with the vehicle, and a parameter $\xi$ corresponding to the damping associated with the vehicle. The rollover equation of motion is defined by differential Equation 8.

$$\Theta'' + (X \cdot \Theta') + (Y \cdot \Theta) = Z \quad \text{Equation 8}$$

where:

$$X = 2 \cdot \xi \cdot \sqrt{Y}$$

$$Y = \frac{K \cdot D_0^2}{I}$$

$$Z = \frac{(F \cdot H_0) - \left(\frac{W \cdot D_0}{2}\right) - \left[\left(\frac{(D_1 - D_0) \cdot \cos(\Phi)}{2}\right) + (H_1 \cdot \sin(\Phi))\right] \cdot P}{I}$$

Figure 5:
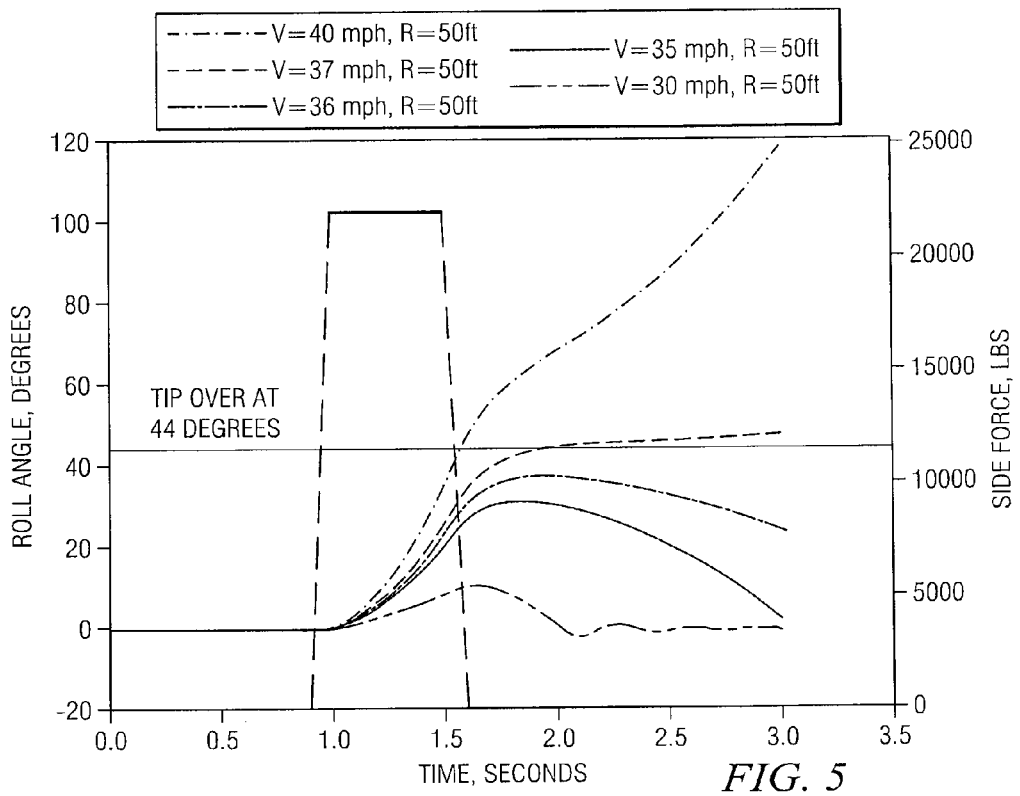
FIG. 5 illustrates a plot of roll angle versus time for a particular vehicle at a varying vehicle speeds at a turn radius of fifty feet on level ground not taking into account any roll countering force generated by one or more vehicle thrusters.
Figure 6:
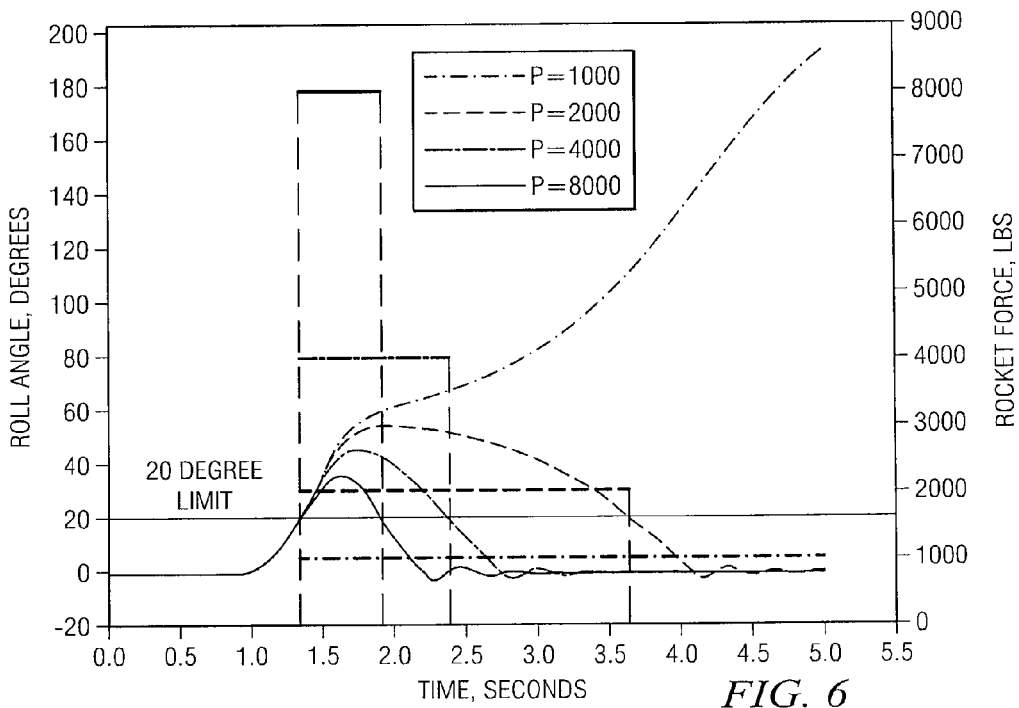
FIG. 6 illustrates a plot of roll angle versus time for a particular vehicle at a vehicle speed of forty miles per hour with a turn radius of fifty feet on level ground taking into account varying roll countering forces generated by one or more vehicle thrusters.

Solving the differential rollover equation of motion may allow the generation of plots (as depicted in FIGS. 5-6, described in further detail below) of information that may be used in selecting the appropriate thresholds for a particular vehicle, the appropriate number of vehicle thrusters for the particular vehicle, and the capabilities of those vehicle thrusters.

FIG. 5 illustrates a plot of roll angle versus time for a particular vehicle at a varying vehicle speeds at a turn radius of fifty feet on level ground not taking into account any force P generated by one or more vehicle thrusters 108, as described above. The illustrated plot may be generated according to the rollover equation of motion (Equation 8), described above. The plot is illustrative of the effects on a vehicle at varying speeds of a short turn (turn duration is 0.7 seconds, shown from time 0.9 to time 1.6), such as may be experienced by a vehicle swerving to avoid an impediment in the vehicle path. The plot indicates that for the specified turn duration, the vehicle will right itself for vehicle speeds of up to 36 miles per hour. For any speed greater than 36 miles per hour, the 0.7 second turn having a fifty foot turn radius would result in a vehicle rollover.

Generating a number of similar plots simulating a number of different vehicle turning events at varying speeds and turn radii (consistent with the capabilities for a particular vehicle), may allow one or more points at which a particular vehicle is considered close to rollover to be determined. The one or more points at which a particular vehicle is considered close to rollover may be used to define one or more predefined threshold roll angles and/or predefined threshold roll rates, as described above. The one or more predefined threshold roll angles and/or predefined threshold roll rates may be subsequently be stored in memory module 116 of the roll countering controller 106 such that roll countering application 112 may access the information in determining if the vehicle is close to rollover, as described above.

Generating a number of similar plots simulating a number of different vehicle turning events at varying speeds and turn radii may also allow one or more points at which a vehicle rollover is considered imminent to be identified. The one or more points at which a vehicle rollover is considered imminent may be used to define one or more predefined maximum allowable roll angles and/or maximum allowable roll rates, as described above. The one or more predefined maximum allowable roll angles and/or maximum allowable roll rates may be subsequently be stored in memory module 116 of the roll countering controller 106 such that roll countering application 112 may access the information in determining if a vehicle rollover is imminent, as described above.

FIG. 6 illustrates a plot of roll angle versus time for a particular vehicle at a vehicle speed of forty miles per hour with a turn radius of fifty feet on level ground taking into account varying roll countering forces P generated by one or more vehicle thrusters 108, as described above. The illustrated plot may be generated according to the rollover equation of motion (Equation 8), described above. The illustrated plot represents a vehicle for which rollover is considered imminent at twenty degrees (determined as described above with regard to FIG. 5). Therefore, the one or more vehicle thrusters 108 may fire at the point in time when the vehicle roll angle reaches twenty degrees. Furthermore, the varying forces P supplied by the one or more vehicle thrusters 108 are plotted as being applied for the duration of the time the vehicle roll angle is twenty degrees or greater. For example, as depicted in FIG. 6, a force P of 8000 lbs applied for a duration of approximately 0.5 seconds is sufficient to counter the vehicle rollover caused by the forty mile per hour turn with a fifty foot turn radius.

By generating a number of similar plots simulating a number of different vehicle turning events at varying speeds and turn radii (consistent with the capabilities for a particular vehicle) and factoring in the amount and duration of thrust required to cancel the various vehicle rollovers, vehicle thrusters 108 may be chosen for a particular vehicle that maximize the roll countering capability for a particular vehicle while minimizing system cost (particularly the cost associated with the one or more vehicle thrusters, as it is assumed the more force generated by a vehicle thruster, the higher the cost for the vehicle thruster). For example, if the particular vehicle for which the plot depicted in FIG. 6 was generated had a maximum speed of forty miles per hour and a minimum turn radius of fifty feet (meaning that the most extreme vehicle rollover due to turning on level ground possible for the vehicle would takes place at forty miles per hour with a fifty foot turn radius), it would be sufficient to place one or more vehicle thrusters 108 on the vehicle capable of generating a total of 8000 lbs of force for approximately 0.5 seconds.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
    accessing data associated with a plurality of vehicle parameters for a vehicle;
    determining, based on the accessed data associated with a first subset of the plurality of vehicle parameters, if a vehicle rollover is imminent;
    determining, in response to a determination that a vehicle rollover is imminent, a roll countering solution comprising an identification of an amount of force for canceling the imminent rollover, the roll countering solution being determined based on the accessed data associated with a second subset of the plurality of vehicle parameters, the second subset of the plurality of vehicle parameters including at least one vehicle parameter corresponding to an operating condition of the vehicle;
    determining, based on the roll countering solution, one or more vehicle thrusters to execute the determined roll countering solution; and
    signaling the one or more vehicle thrusters to discharge to execute the determined roll countering solution.

2. The method of claim 1, wherein:
    the first subset of the plurality of vehicle parameters comprises a vehicle roll angle; and
    determining if a vehicle rollover is imminent comprises determining if the vehicle roll angle exceeds a maximum allowable roll angle.

3. The method of claim 1, wherein
    the first subset of the plurality of vehicle parameters comprises a vehicle roll rate; and determining if a vehicle rollover is imminent comprises determining if the vehicle roll rate exceeds a maximum allowable roll rate.

4. The method of claim 1, wherein:
the first subset of the plurality of vehicle parameters comprises a vehicle roll angle and a vehicle roll rate; and
determining if a vehicle rollover is imminent comprises determining if the vehicle roll rate exceeds a maximum allowable roll rate corresponding to the roll angle.

5. The method of claim 1, comprising:
determining, based on the accessed data associated with a third subset of the plurality of vehicle parameters, if the vehicle is close to rollover;
signaling, in response to a determination that the vehicle is close to rollover, a roll warning indicator.

6. The method of claim 1, wherein each of the one or more vehicle thrusters is operable to discharge a defined amount of force in a defined direction.

7. The method of claim 1, wherein the first subset and the second subset have at least one vehicle parameter in common.

8. A system, comprising one or more processing units operable to:
access data associated with a plurality of vehicle parameters for a vehicle;
determine, based on the accessed data associated with a first subset of the plurality of vehicle parameters, if a vehicle rollover is imminent;
determine, in response to a determination that a vehicle rollover is imminent, a roll countering solution comprising an identification of an amount of force for canceling the imminent rollover, the roll countering solution being determined based on the accessed data associated with a second subset of the plurality of vehicle parameters, the second subset of the plurality of vehicle parameters including at least one vehicle parameter corresponding to an operating condition of the vehicle;
determine, based on the roll countering solution, one or more vehicle thrusters to execute the determined roll countering solution; and
signal the one or more vehicle thrusters to discharge to execute the determined roll countering solution.

9. The system of claim 8, wherein:
the first subset of the plurality of vehicle parameters comprises a vehicle roll angle; and
determining if a vehicle rollover is imminent comprises determining if the vehicle roll angle exceeds a maximum allowable roll angle.

10. The system of claim 8, wherein
the first subset of the plurality of vehicle parameters comprises a vehicle roll rate; and
determining if a vehicle rollover is imminent comprises determining if the vehicle roll rate exceeds a maximum allowable roll rate.

11. The system of claim 8, wherein:
the first subset of the plurality of vehicle parameters comprises a vehicle roll angle and a vehicle roll rate; and
determining if a vehicle rollover is imminent comprises determining if the vehicle roll rate exceeds a maximum allowable roll rate corresponding to the roll angle.

12. The system of claim 8, wherein the one or more processing units are operable to:
determine, based on the accessed data associated with a third subset of the plurality of vehicle parameters, if the vehicle is close to rollover;
signal, in response to a determination that the vehicle is close to rollover, a roll warning indicator.

13. The system of claim 8, wherein each of the one or more vehicle thrusters is operable to discharge a defined amount of force in a defined direction.

14. The system of claim 8, wherein the first subset and the second subset have at least one vehicle parameter in common.

15. A vehicle, comprising:
one or more sensors operable to record data associated with one or more vehicle parameters corresponding to operating conditions of a vehicle;
a roll countering controller operable to:
access data associated with a plurality of vehicle parameters, the plurality of vehicle including the one or more vehicle parameters corresponding to operating conditions of a vehicle;
determine, based on the accessed data associated with a first subset of the plurality of vehicle parameters, if a vehicle rollover is imminent; and
determine, in response to a determination that a vehicle rollover is imminent, a roll countering solution comprising an identification of an amount of force for canceling the imminent rollover, the roll countering solution being determined based on the accessed data associated with a second subset of the plurality of vehicle parameters, the second subset of the plurality of vehicle parameters including at least one of the one or more vehicle parameters corresponding to operating conditions of the vehicle;
one or more vehicle thrusters operable to, upon receipt of a signal to discharge to execute the determined roll countering solution from the roll countering controller, discharge an amount of force.

16. The vehicle of claim 15, wherein:
the first subset of the plurality of vehicle parameters comprises a vehicle roll angle; and
determining if a vehicle rollover is imminent comprises determining if the vehicle roll angle exceeds a maximum allowable roll angle.

17. The vehicle of claim 15, wherein
the first subset of the plurality of vehicle parameters comprises a vehicle roll rate; and
determining if a vehicle rollover is imminent comprises determining if the vehicle roll rate exceeds a maximum allowable roll rate.

18. The vehicle of claim 15, wherein:
the first subset of the plurality of vehicle parameters comprises a vehicle roll angle and a vehicle roll rate; and
determining if a vehicle rollover is imminent comprises determining if the vehicle roll rate exceeds a maximum allowable roll rate corresponding to the roll angle.

19. The vehicle of claim 15, wherein:
the vehicle comprises a roll warning indicator; and
the one or more processing units are operable to:
determine, based on the accessed data associated with a third subset of the plurality of vehicle parameters, if the vehicle is close to rollover;
signal, in response to a determination that the vehicle is close to rollover, a roll warning indicator.

20. The vehicle of claim 15, wherein each of the one or more vehicle thrusters is operable to deploy a defined amount of force in a defined direction.

21. The vehicle of claim 15, wherein the first subset and the second subset have at least one vehicle parameter in common.

* * * * *